Aug. 4, 1953  M. P. REHORN  2,647,440
MOLECULARLY ALIGNED SHEET MATERIAL
Filed Aug. 8, 1947  2 Sheets-Sheet 1

INVENTOR.
BY Miles P. Rehorn
John F. Rule

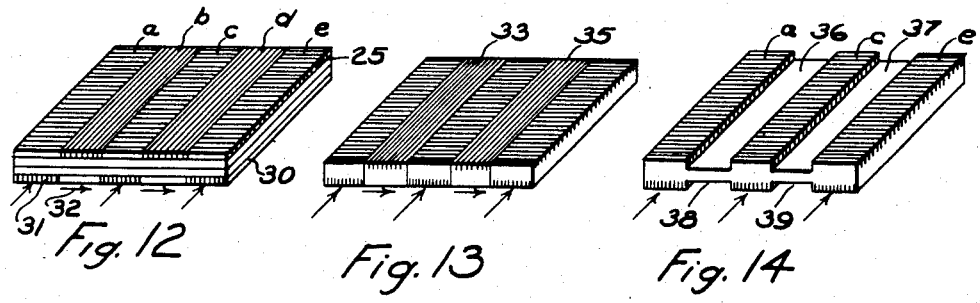
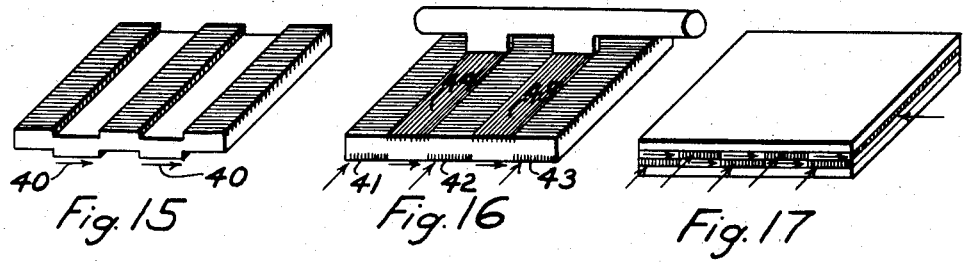
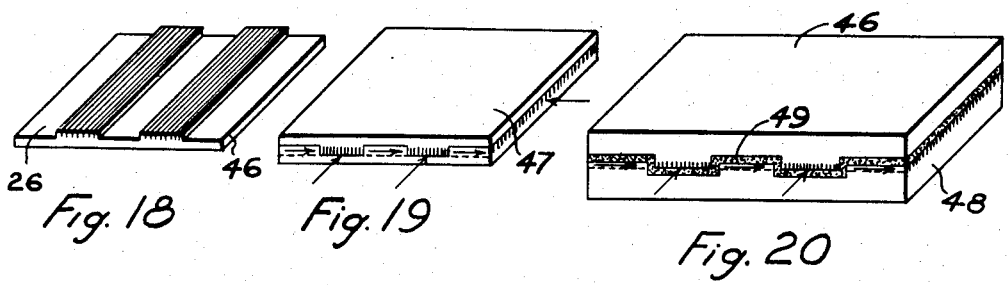
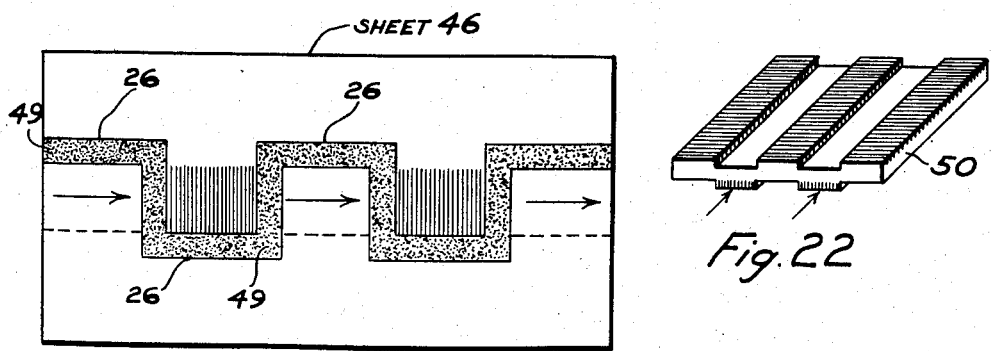

Patented Aug. 4, 1953

2,647,440

UNITED STATES PATENT OFFICE 2,647,440

MOLECULARLY ALIGNED SHEET MATERIAL

Miles P. Rehorn, Nashville, Tenn.

Application August 8, 1947, Serial No. 767,567

11 Claims. (Cl. 88—65)

This invention relates to oriented and polarized plastic material.

An object of this invention is to provide film means for receiving dichroic images which, when superimposed, form a light polarizing image.

The invention further relates to film means forming screens for use in viewing such images.

Referring to the accompanying drawings:

Fig. 5A is a retardation element which may be produced by some of the methods disclosed in this application.

Figs. 6, 6A, 7 and 8 are diagrammatic views of sheets of plastic material adapted for use in making the various forms of the screens and film forming the subject matter of the present invention.

Fig. 12 is a view showing a composite sheet formed by combining two sheets corresponding to that of Fig. 9.

Fig. 13 is a composite sheet which may be formed from sheet material such as shown in Fig. 8.

Fig. 14 is a view showing a sheet which may be fabricated from the sheet shown in Fig. 8.

Fig. 15 illustrates a sheet formed from the sheet of Fig. 7.

Fig. 16 shows the application of a processing method to a sheet such as shown in Fig. 7.

Fig. 17 illustrates a method of combining two sheets such as shown in Fig. 9.

Fig. 18 shows a sheet cut or grooved in a manner adapting it to be combined with the sheet shown in Fig. 10.

Fig. 19 is a composite sheet comprising the combination of the sheets shown in Figs. 10 and 18.

Fig. 20 shows the same sheet on a somewhat larger scale to illustrate certain structural features.

Fig. 21 gives an end view of the sheet on a comparatively large scale to illustrate structural features in greater detail.

Figure 8:
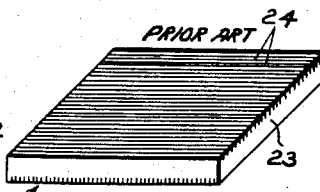

Fig. 22 is a view showing a sheet which may be fabricated from the sheet shown in Fig. 8.

Arrows in the accompanying drawings indicate the direction of molecular orientation where it is either unnecessary, difficult, or impossible to show said direction of orientation by surface lining.

It will be understood that in all the views, the sheet material is illustrated diagrammatically on a comparatively large scale. The depth of the molecular orientations and the width and depth of the channels or cut away portions may be varied through a wide range, and sometimes may be of microscopic proportions.

Figure 1:
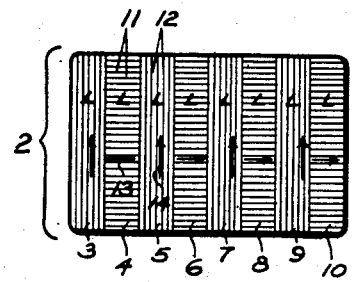
Fig. 1 is a schematic view of a film surface containing a stereo image.

Referring to Fig. 1, 2 illustrates a film surface comprising molecularly oriented strips 3 to 10, adjoining strips being oriented in directions at right angles to each other, as indicated by parallel lines 11 and 12. Said film surface, as indicated diagrammatically, contains a left eye dichroic stereo image comprising unit views L whose polarizing axes (produced by said orientation) are extended respectively in the directions of arrows 13 and 14, which directions are respectively identical with those of said orientation.

Figure 2:
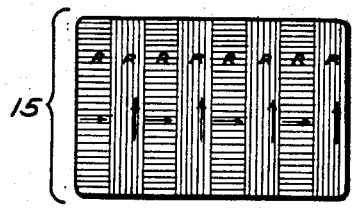
Fig. 2 is a view of a similar surface containing the companion stereo image.

Fig. 2 shows a film surface 15 similar to that of Fig. 1 and containing the companion right eye dichroic image. The unit views R or strips of the right eye image have their polarizing axes and directions of the molecular orientation at right angles to those of the corresponding parts of the left eye image (Fig. 1).

Figure 3:
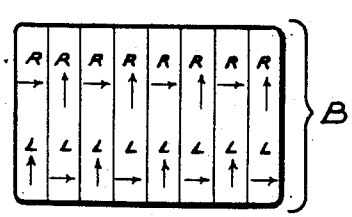
Fig. 3 shows both surfaces superimposed, forming image B.
Figure 4:
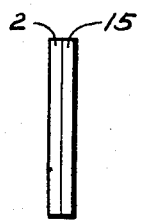
Fig. 4 is an end elevational view of the same.

Figs. 3 and 4 show the two film surfaces 2 and 15 containing the companion images superimposed, thereby forming the image B as a light polarizing image. Such film surfaces may occupy separate film sheets, or may be the opposite surfaces of the same sheet.

Figure 5:
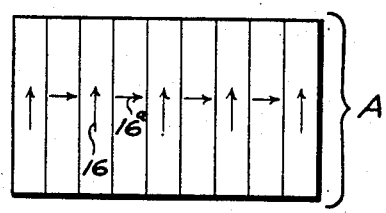
Fig. 5 is a viewing screen A through which the image B may be viewed stereoscopically.

Fig. 5 shows a screen A which comprises unit light polarizing strips, each of which has a polarizing axis (indicated by arrows 16 and 16a) extended at right angles to that of each adjacent strip.

Fig. 5A shows a retardation element which comprises a plurality of adjacently disposed retardation strips.

The image B, in the form of a light polarizing image, the light polarizing screen A for viewing the image stereoscopically, the retardation element of Fig. 5A, and various methods of combining them, are disclosed and claimed in my copending application, Serial No. 767,569, filed August 8, 1947.

Figure 6:
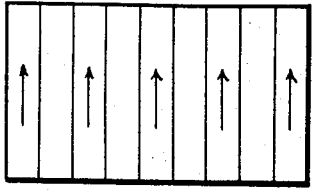
Figure 6:
Figure 7:
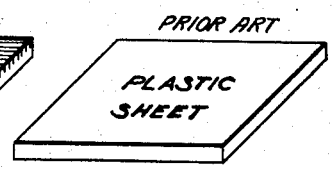
Figure 7:
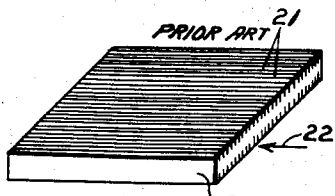

Figs. 6, 7 and 8 schematically represent sheets of material employed in the present invention and which are disclosed and described as articles of manufacture in U. S. patent to Land et al. No. 2,380,363, July 10, 1945.

Fig. 6 shows a plastic sheet 17 having a single surface uniformly molecularly oriented in the direction of the parallel lines 19.

Fig. 7 shows a plastic sheet 20 identical with sheet 17, Fig. 6, except that it has both its upper and lower surfaces molecularly oriented, both in the same direction, as indicated by parallel lines 21 and the arrow 22.

Fig. 8 shows a plastic sheet 23 identical with sheet 20, Fig. 7, except that the opposite surfaces are molecularly oriented in directions at right angles to each other, as indicated by parallel lines 24 and the arrow 24a.

Figure 9:
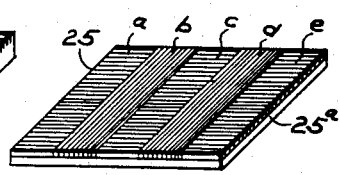
Fig. 9 is a view showing a composite sheet having the surface portions molecularly oriented in a predetermined pattern.

Fig. 9 shows a sheet 25 corresponding to sheet 2 (Fig. 1) or sheet 15 (Fig. 2) except that the strips are shown as they appear before receiving the dichroic image and (for the sake of brevity) fewer in number. The sheet 25 comprises strips a, b, c, d and e. The strips b and d have their upper surface portion oriented in a direction lengthwise of the strips, while the strips a, c and e have their upper surface portions oriented in a direction at right angles to that of strips b and d. Such a composite sheet, when uniformly stained with a dichroic stain, becomes screen A, Fig. 5.

The sheet 25 (Fig. 9) may be formed from the sheet material 17 (Fig. 6) by cutting the strips a, b, c, d and e from said material and then fitting them together as shown in Fig. 9. The strips may be cemented to a base 25a consisting of a sheet of transparent non-polarizing and non-retarding material as, for example, glass. By honing the edges of the strips, they may be made to fit closely so that the joints are invisible, or nearly so.

As has already been pointed out, such a sheet, when uniformly stained with a dichroic stain, becomes screen A (Fig. 5). If desired, the sheet 17 (Fig. 6) may be stained before cutting into strips. Such material is now on the market and sold under the trade name Polaroid. Parallel lines 19 in this instance represent the polarizing axis. One set of strips will be cut in a direction parallel with the polarizing axis, and the other set at right angles to said axis.

One form of Polaroid, namely that referred to in the preceding paragraph, consists of initially substantially homogeneous sheet material from the class consisting of the transparent, linear, high polymeric plastics, the molecules throughout the central portion of the sheet being substantially disoriented, and a surface portion including a surface of the sheet having the molecules thereof substantially oriented to an appreciable depth. A material of this character is defined in claim 1 of the patent to Land et al., No. 2,380,363, July 10, 1945, Light Polarizer and Process of Manufacture, to which patent reference may be had for a full disclosure of this and other forms of such a material coming under the trade name "Polaroid."

Figure 10:
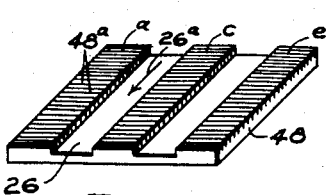
Fig. 10 is a view showing a sheet similar to Fig. 6 but with surface portions removed.

Another manner in which a sheet having the same pattern of molecular orientation as the sheet 25 (Fig. 9) may be formed from the sheet 17 (Fig. 6), is to cut away portions of said sheet 17 as shown in Fig. 10, to form grooves 26, leaving the strips a, c and e with their original horizontal molecular alignment as shown. Such grooves may be cut or ruled extremely narrow if desired, for example .0003" in width, by using such a machine as is employed for the manufacture of half tone screens or diffraction gratings. Then there is flowed into the grooves a suitable plastic material in a liquid or near liquid form, the grooves being thus filled. A material suitable for this purpose is a liquid transparent polyvinyl alcohol or other transparent, linear, high polymeric plastic, the molecules of which contain hydroxyl groups. Reference may be had to the U. S. patent to Carnahan No. 2,385,687 September 25, 1945, in which is a full disclosure of a method which may be used in applying the above described material as well as that disclosed in the patent.

Care must be taken to align the molecules of at least the surface of the liquid plastic in said grooves in a direction at right angles to the direction of the molecular alignment of the surface strips a, c and e. The resulting sheet, when properly stained with a dichroic stain (as has already been pointed out), becomes screen A, Fig. 5.

Another method of forming the screen employs pre-stained material corresponding to the sheet 17 (Fig. 6). Such pre-stained material, sold under the trade name Polaroid, may be used in a manner similar to that above described, to form said screen. The grooving will be performed in a direction at right angles to that of the polarizing axis (parallel lines 48a, Fig. 10, in this instance representing the polarizing axis). The grooves will then be filled with a liquid (or near liquid) dichroic material, such as "herapathite" mulled in a viscous cellulosic matrix. During or after the deposition of the material in the grooves (depending on the nature of the liquid used), it may be subjected to suitably directed magnetic or electric fields which interact with the individual molecular particles to align the crystals in the preferred direction with respect to the fields. Or the liquid may be deposited by means of a long narrow tube or slit, such as disclosed in the above mentioned patent, causing the needle-like crystals to be aligned in the direction of the flow of the material, directing either the magnetic fields or the line of flow in a direction 26a (Fig. 10) at right angles to the direction of the polarizing axis 48a of the remaining polarizing strips a, c and e. Before or after the deposited dichroic material has dried, all except that which is in the grooves is removed. Reference may be had to the above mentioned Patent No. 2,385,687 in which is a full disclosure of such a material and method of applying it.

Figure 11:
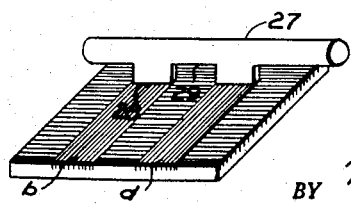
Fig. 11 illustrates a method of molecularly orienting surface portions of a sheet (Fig. 6) in a predetermined pattern.

Fig. 11 illustrates a method and apparatus for molecularly orienting alternate strips of the sheet 17 (Fig. 6), converting it into the sheet 25 (Fig. 9). According to this method, the sheet is heated sufficiently to soften the surface portion. The orientation is then effected with the aid of an implement 27 comprising a series of blades or teeth 28 attached to, or formed integral with, a rod 29. The blades are spaced apart lengthwise of the rod to provide intervening spaces of the same width as the blades. In operation, blades are brought in contact with the softened surface of the sheet and held with the required pressure while the implement is drawn across the sheet (or the sheet is drawn across the implement), thereby causing a molecular alignment or orientation of the surface portion with which the blades contact, thus producing oriented strips (b and d) in which the molecular alignment is perpendicular to that of the adjoing strips which constitute the remainder of the sheet.

If a sheet of material (from the class consisting of the transparent, linear high polymeric plastics, the molecules of which contain hydroxyl groups corresponding to the sheet Fig. 6A, the molecules of which are heterogeneously disoriented throughout the body of the sheet, also throughout its surfaces) such as regenerated cellulose is used instead of the sheet of Fig. 6, the above described implement being passed over one of the softened surfaces of said sheet in the manner already disclosed, molecularly aligning alternate strips of said surface, leaving the intervening strips disoriented or unaligned, the retardation element of Fig. 5A may be formed.

Another method of forming the screen A, Fig. 5, is to cut grooves or channels in a sheet of polarizing plastic material corresponding to the sheet 17, Fig. 6, having a polarizing axis extended in a single direction, as indicated by parallel line 19, cutting said grooves in the manner shown in Fig. 10 and deep enough to remove the polarizing surface material. The plastic forming said polarizing sheet will be either polyvinyl alcohol or some other transparent linear high polymeric plastic containing hydroxyl groups. The grooved surfaces are heated sufficiently to soften them, then the implement 27, Fig. 11, is brought in contact with the sheet, the teeth or blades of said implement contacting said softened groove surfaces, being held thereagainst with the required pressure while the implement is drawn across the sheet (or the sheet is drawn across the implement) in the direction of the grooves, thereby causing a molecular alignment or orientation of the surface portions of the grooves which the blades contact, thus molecularly orienting the groove surfaces 26 in a direction at right angles to that of the polarizing axis of the remaining strips a, c and e (Fig. 10) of the original polarizing sheet, Fig. 6. The molecularly aligned groove surfaces are then stained with a dichroic stain, rendering them light polarizing.

Fig. 12 shows a composite sheet which may be made by combining the sheet 25 (Fig. 9) with a similar sheet 30, the sheets being placed one over the other and cemented together. The sheet 30 comprises strips 31 having their surface portions oriented longitudinally, said strips alternating with strips oriented at right angles thereto, as indicated by arrows 32. The composite sheet shown in Fig. 12 is adapted to serve as a film suitable for receiving, on its opposite surfaces respectively, the images comprising a pair of dichroic stereo images, thus forming image B as a light polarizing image, Figs. 3 and 4.

Fig. 13 shows a composite sheet (similar to that shown in Fig. 12) which may be made from strips cut from a sheet such as 23 (Fig. 8). The alternate strips 33 and 35 have been inverted and arranged in the manner shown, so that the upper and lower surfaces present the same pattern of orientation as the sheet in Fig. 12.

Another method by which a sheet corresponding to that of Fig. 12 may be made from the sheet 23 (Fig. 8) is to cut or rule grooves or channels (in the manner previously described) in both the upper and lower surfaces of the sheet as shown in Fig. 14. The channels in the two surfaces of the sheet are directly opposite, the channels of the lower surface being in register with those of the upper surface. The grooves are then filled with a suitable liquid or near liquid plastic such as above described. The material is then molecularly aligned, taking care to align the molecules of at least the surface of the plastic, filling the grooves 36 and 37 in a direction lengthwise of the grooves, and aligning those of the plastic filling the grooves 38 and 39 at right angles to the direction of the grooves.

Still another way of forming a sheet corresponding to that of Fig. 12 is to cut grooves in a sheet such as 20 (Fig. 7) in the manner shown in Fig. 15. In this instance, the channels are cut in the upper and lower surfaces of the sheet, the channels of the lower surface alternating with the upper channels as respects their positions laterally of the sheet. As indicated by the arrows 40, the remaining lower strips have a direction of surface molecular orientation identical with that of the upper strips. The grooves are filled in with the molecularly orientable plastic referred to above, taking care to align the molecules of the plastic in all grooves in a direction lengthwise of said grooves.

A preferred method of forming a sheet corresponding to that of Fig. 12 is shown in Fig. 16 which illustrates an orienting implement and method of operation similar to that of Fig. 11 except that a sheet of material, such as sheet 20 (Fig. 7), is processed. Strips of the opposite surfaces of the sheet 20 are oriented in the same direction, the oriented strips 41, 42 and 43 of the lower surface alternating with those (44 and 45) of the upper surface as respects their positions laterally of the sheet.

Fig. 17 shows another manner in which two sheets corresponding to sheet 25, Fig. 9, may be superimposed, after each has received one of the dichroic stereo pair, to form the image B (Figs. 3 and 4) as a light polarizing image. The two sheets have their oriented surfaces turned inwardly, facing each other.

It has already been shown how the sheet 25, Fig. 9, may be converted into screen A, Fig. 5, by simply staining the oriented surface with a dichroic stain. Another manner in which screen A, Fig. 5, may be produced is to form from a sheet 17, Fig. 6, a grooved sheet such as shown in Fig. 10, and also a complemental similarly grooved sheet 46, Fig. 18. This sheet 46 differs from that of Fig. 10 in that the grooves or cut away portions 26 extend in the same direction as the orientation, rather than at right angles to it. The two complemental sheets are first stained with a dichroic stain, to render the remaining oriented strips light polarizing, and are then fitted together to form the composite light polarizing sheet 47, as shown in Fig. 19.

Figs. 20 and 21 illustrate the composite sheet 47, Fig. 19, in greater detail. Fig. 21 is an end elevational view of this sheet on a comparatively large scale. As indicated in Figs. 10, 14 and 15, the depth of the grooves or cut away portions corresponds to the depth to which the molecular orientation extends below the surface of the sheet. However, in this instance, as indicated in Fig. 21, the grooves or recesses 26 are cut to an even greater depth. The channels 26 are slightly deeper, also slightly wider, than the intervening oriented strips so that, when the complementary sheets 48 (Fig. 10) and 46 (Fig. 18) are fitted together, there is a slight clearance between them. This provides space for the thin layer of cement 49 by which the sheets are cemented together. The clearance also allows room for the strips to readily slip between the grooves in the assembling operation.

If the grooved sheet of either Fig. 10 or of Fig. 18 is formed from a sheet of material (corresponding to the sheet of Fig. 6), such as regenerated cellulose, whose molecularly aligned surface is a retarding surface (said sheet having been formed from a sheet corresponding to the above described sheet of Fig. 6A), then the resulting sheet (either 48, Fig. 10, or 46, Fig. 18) will be the retardation element of Fig. 5A.

Referring again to Figs. 20 and 21: If it is desired, instead of applying the dichroic stain after the grooving operation, pre-stained sheet material such as above described (corresponding to 17, Fig. 6) may be used to form screen A (Fig. 5).

In this instance the grooving process will remove the polarizing surfaces corresponding to the molecularly aligned surfaces removed from the grooves 26 of Figs. 10 and 18. The grooving in one case follows the direction of the polarizing axis, and in the other progresses at right angles to said axis.

Still another method of producing screen A, Fig. 5, is illustrated in Fig. 22 where a grooved sheet 50 is shown which has been formed from a sheet 23 (Fig. 8). In this instance the channels are cut in the upper and lower surfaces of the sheet, the channels of the lower surface alternating with the upper channels as respects their positions laterally of the sheet. When the molecularly oriented strips of both surfaces of the resulting sheet 50 have been stained with a dichroic stain, the sheet will have become identical with screen A, Fig. 5.

The process of staining the fabricated sheet 50 may be eliminated by using pre-stained material corresponding to the sheet 23, Fig. 8. In this instance both surfaces of the sheet will be a light polarizing surface, one having a polarizing axis extended in the direction of the parallel lines 24, the other a polarizing axis extended in the direction of the arrow 24a. This sheet when grooved forms screen A, Fig. 5.

If the grooved sheet of either Fig. 14 or Fig. 22 is formed from a sheet of material (corresponding to the sheet of Fig. 8), such as regenerated cellulose whose molecularly aligned surfaces are retarding surfaces (said sheet having been formed from a sheet corresponding to the above described sheet of Fig. 6A), then each surface of the resulting sheet (either that of Fig. 14 or that of Fig. 22) will correspond to the retardation element of Fig. 5A.

The term "contrasting" as herein used in reference to directions of molecular orientation or light polarization is intended to designate directions at right angles, approximately right angles or any different direction which while permitting the transmission of light polarized in one such direction, would prevent or greatly reduce the transmission of light polarized in the contrasting direction.

I claim:

1. As an article of manufacture, a transparent plastic sheet, each surface of the sheet comprising spaced strips molecularly aligned in one direction and intervening strips filling the spaces and molecularly aligned in a direction at right angles to the first mentioned direction, the strips on one side of the sheet being in register with and in superposed relation to the strips on the opposite side of the sheet, the molecular alignment of each strip being in a contrasting direction to that of the superposed strip in register therewith, all of said strips being confined entirely to and forming surface portions only of the sheet, the sheet being non-laminar, the entire sheet consisting of a continuous body of the same material and of uniform, uninterrupted composition and texture throughout.

2. The article defined in claim 1, each of said surfaces being uniformly stained with a dichroic stain.

3. As an article of manufacture, a transparent plastic sheet, each surface of the sheet comprising spaced strips molecularly aligned in one direction, and intervening strips filling the spaces and molecularly aligned in a direction at right angles to the first mentioned direction, the strips on one side of the sheet being in register with and in superposed relation to the strips on the opposite side of the sheet, the molecular alignment of each strip being in a contrasting direction to that of the superposed strip in register therewith, each of said surfaces containing a dichroic image, all of said strips being confined entirely to and forming surface portions only of the sheet, the sheet being non-laminar, the entire sheet consisting of a continuous body of the same material and of uniform, uninterrupted composition and texture throughout.

4. An article of manufacture comprising a transparent sheet having plastic surface layers forming the surfaces of the sheet, each surface consisting of a single material of uniform and uninterrupted composition and texture throughout and comprising a multiplicity of spaced strips molecularly oriented in a single linear direction and a multiplicity of intervening strips occupying the spaces between said spaced strips and molecularly oriented in a direction at right angles to the first mentioned direction, all of the strips of a given surface being parallel and equal in width and having their outer surfaces all in the same plane, the molecular orientation of each strip being in substantially the same direction throughout the strip, the strips on one side of the sheet being in register with and in superposed relation to the strips on the opposite side of the sheet, all of the said strips being confined to and forming surface portions only of the sheet, the inherent line of demarkation between the strips of a given surface consisting solely of and being defined by the said contrast in their directions of molecular orientation.

5. The article defined in claim 4, the molecular alignment of each strip being in a contrasting direction to that of the superposed strip in register therewith.

6. The article defined in claim 4, each of said surfaces being uniformly stained with a dichroic stain.

7. The article defined in claim 4, each of said surfaces containing a dichroic stain in the form of an image.

8. The article defined in claim 4, the said sheet being non-laminated, the portion of the sheet between said surface layers and which forms the body of the sheet being of the same material, the molecular structure of the said body being uniform and continuous throughout the said body so that the said body is of uniform, uninterrupted composition and texture throughout.

9. The article defined in claim 8, each of said surfaces being uniformly stained with a dichroic stain.

10. The article defined in claim 8, each of said surfaces being stained with a dichroic stain in the form of an image.

11. The article defined in claim 8, the molecular orientation of each strip being in a contrasting direction to that of the superposed strip in register therewith.

MILES P. REHORN.

References Cited in the file of this patent

UNITED STATES PATENTS

| Number | Name | Date |
|---|---|---|
| 2,218,875 | Parsell | Oct. 22, 1940 |
| 2,281,101 | Land | Apr. 28, 1942 |
| 2,301,254 | Carnahan | Nov. 10, 1942 |
| 2,317,875 | Athey et al. | Apr. 27, 1943 |
| 2,380,363 | Land et al. | July 10, 1945 |
| 2,398,506 | Rogers | Apr. 16, 1946 |
| 2,402,166 | Land | June 18, 1946 |